Figure 4:
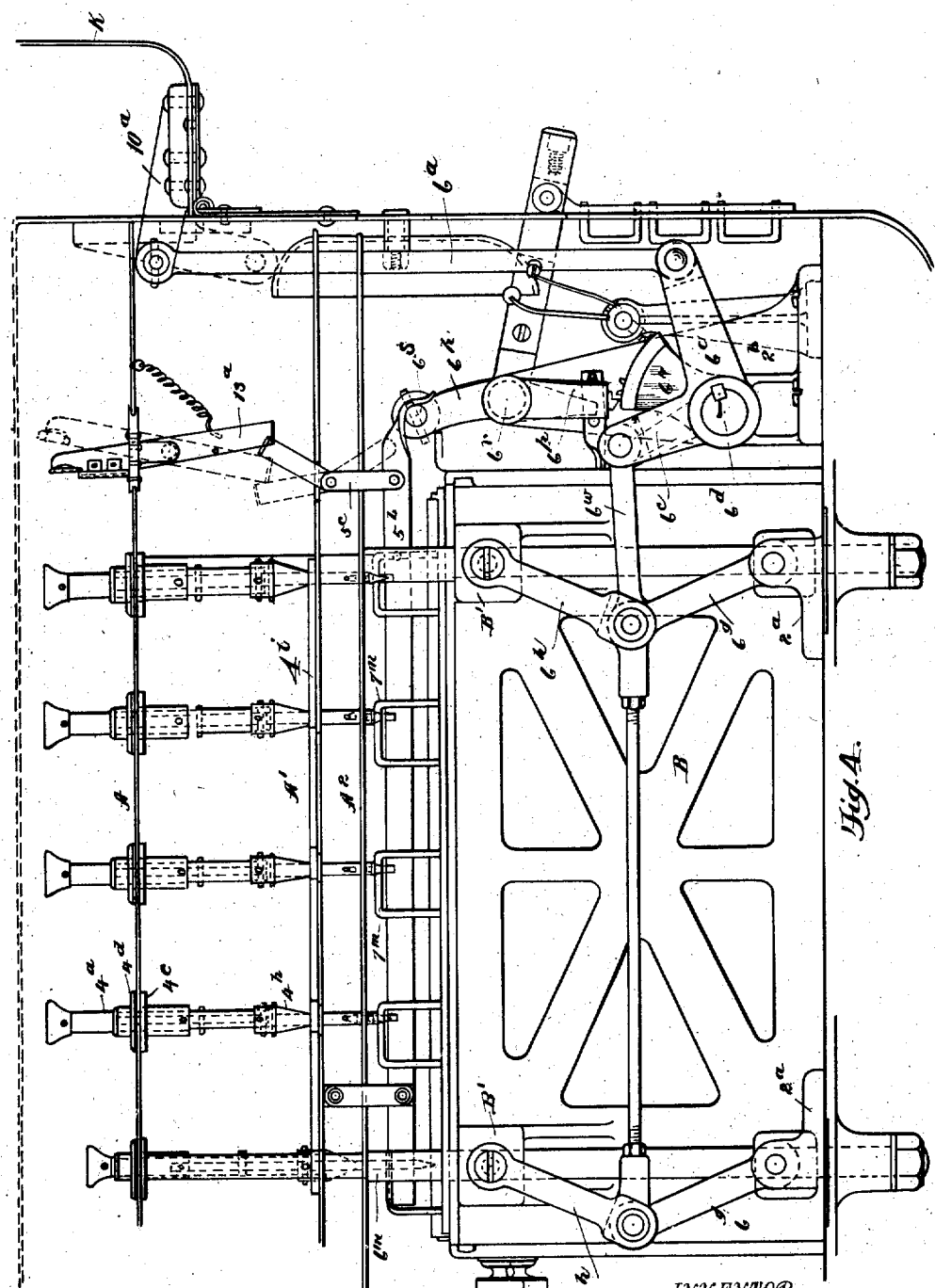

No. 868,579. PATENTED OCT. 15, 1907.
W. B. NORTON.
VOTING MACHINE.
APPLICATION FILED FEB. 27, 1897.
12 SHEETS—SHEET 1.
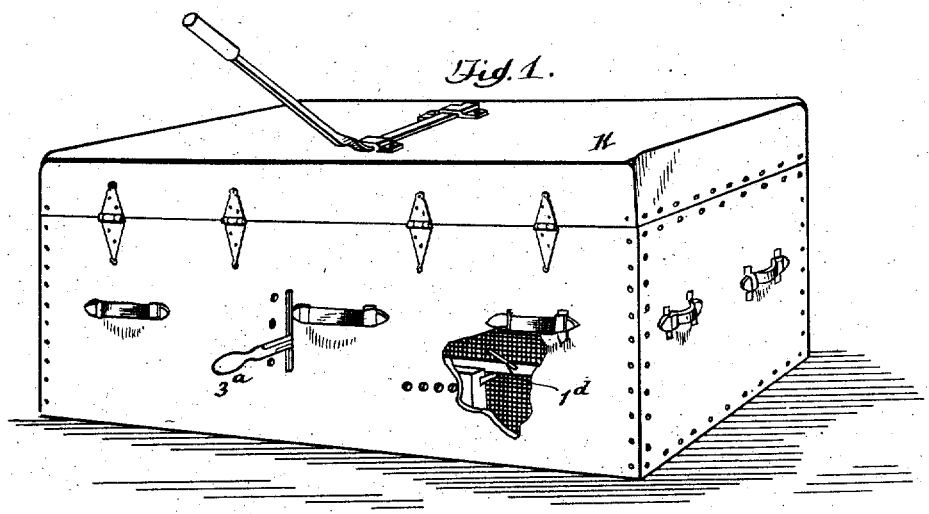
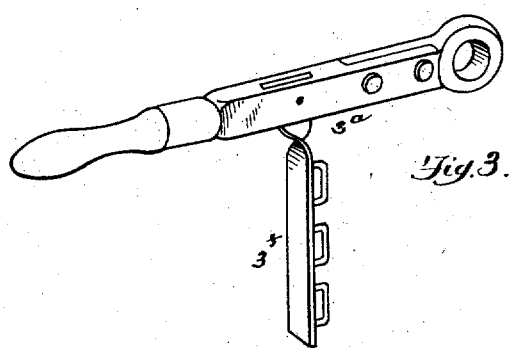
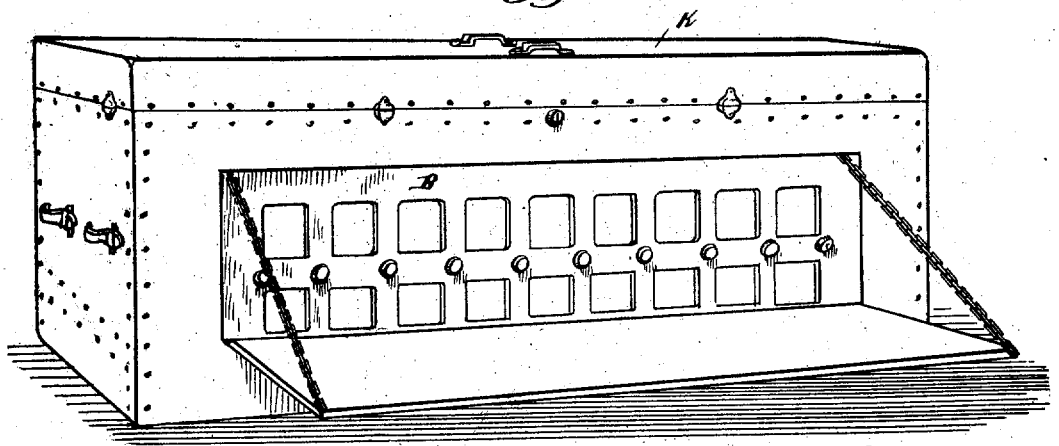
WITNESSES
C. H. Bradford
Virginia M. Clough
INVENTOR
William B. Norton
By Parker & Burton
Attorneys.

No. 868,579. PATENTED OCT. 15, 1907.
W. B. NORTON.
VOTING MACHINE.
APPLICATION FILED FEB. 27, 1897.

12 SHEETS—SHEET 2.

WITNESSES
F. H. Bradford
Virginia W. Clough.

INVENTOR
William B. Norton
By Parker & Burton
Attorneys.

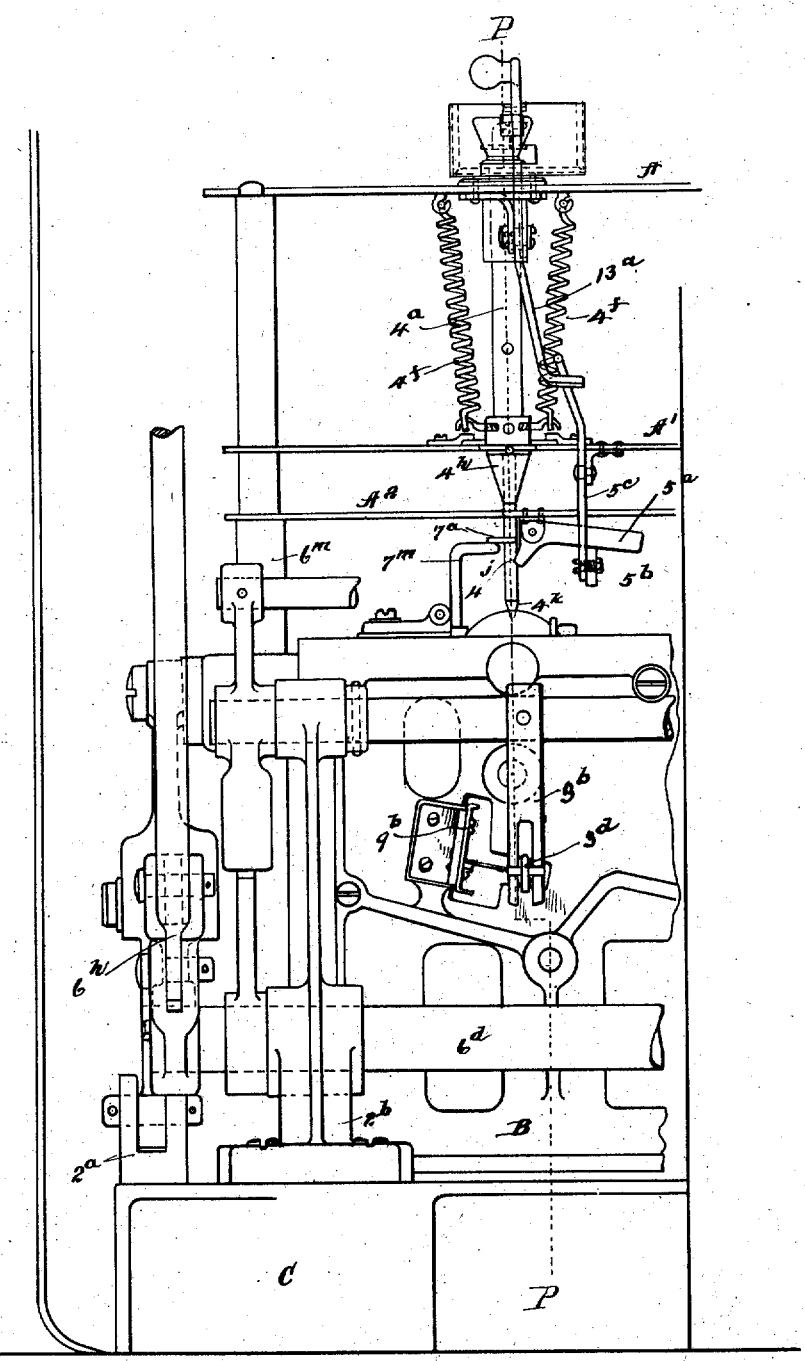

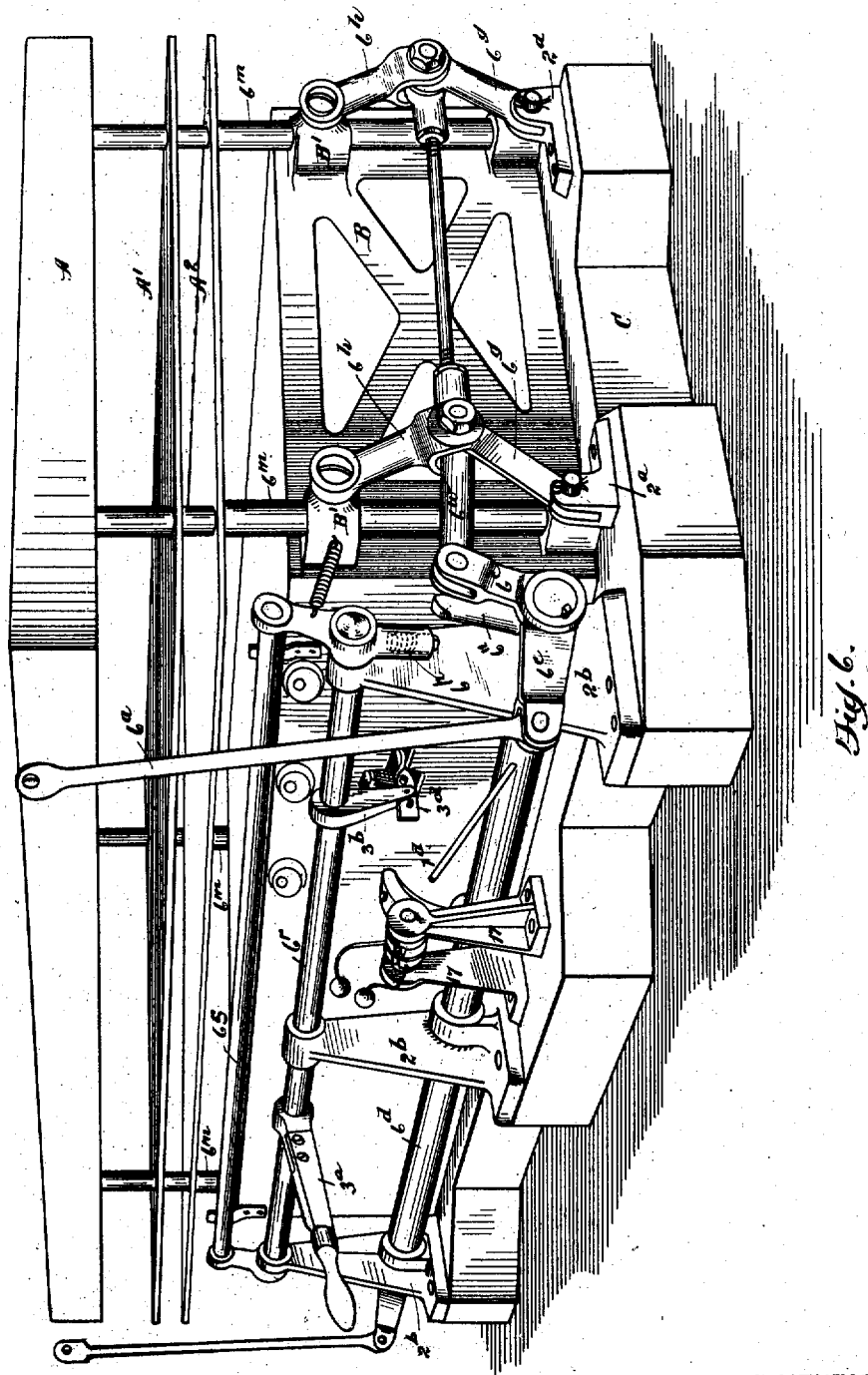

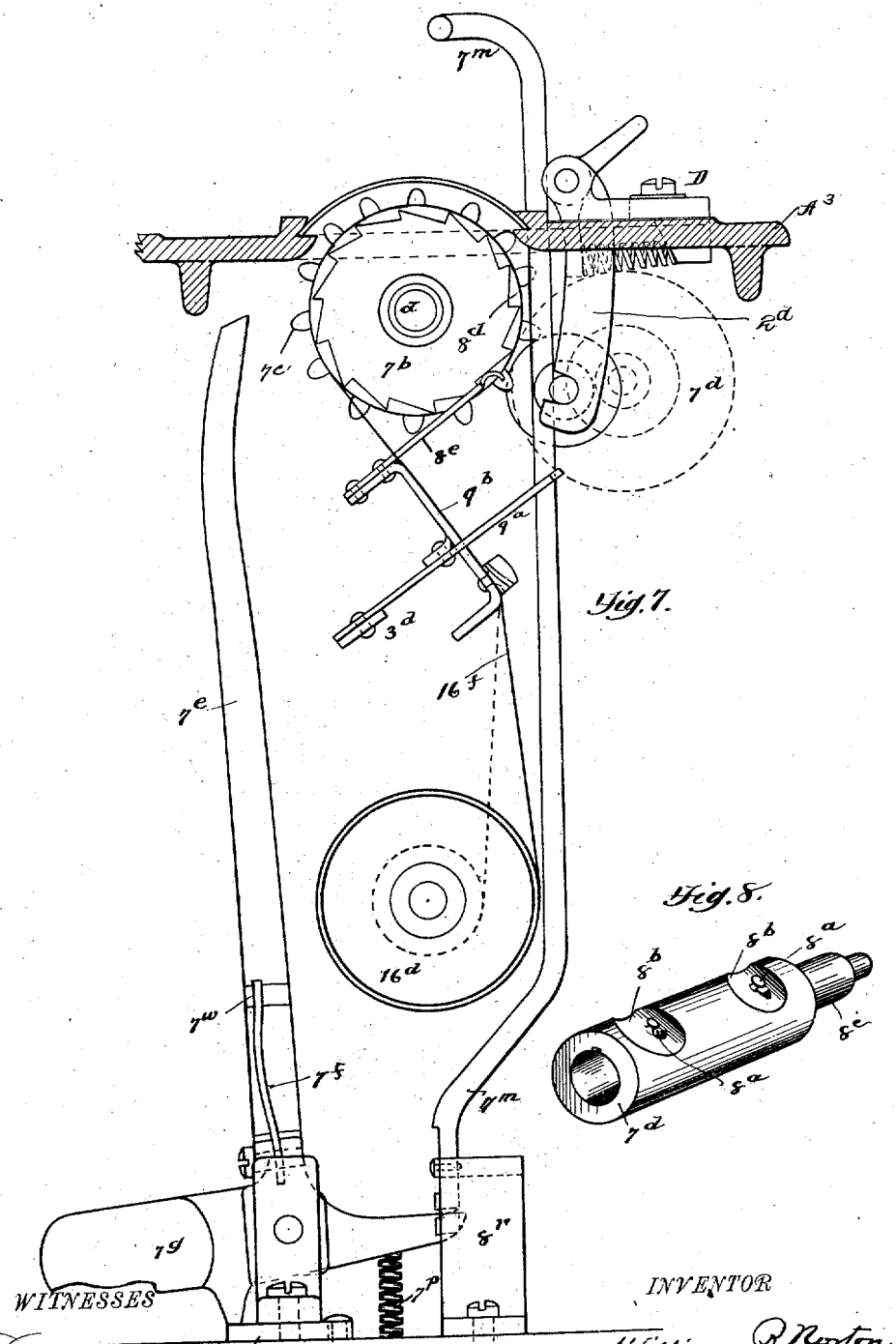

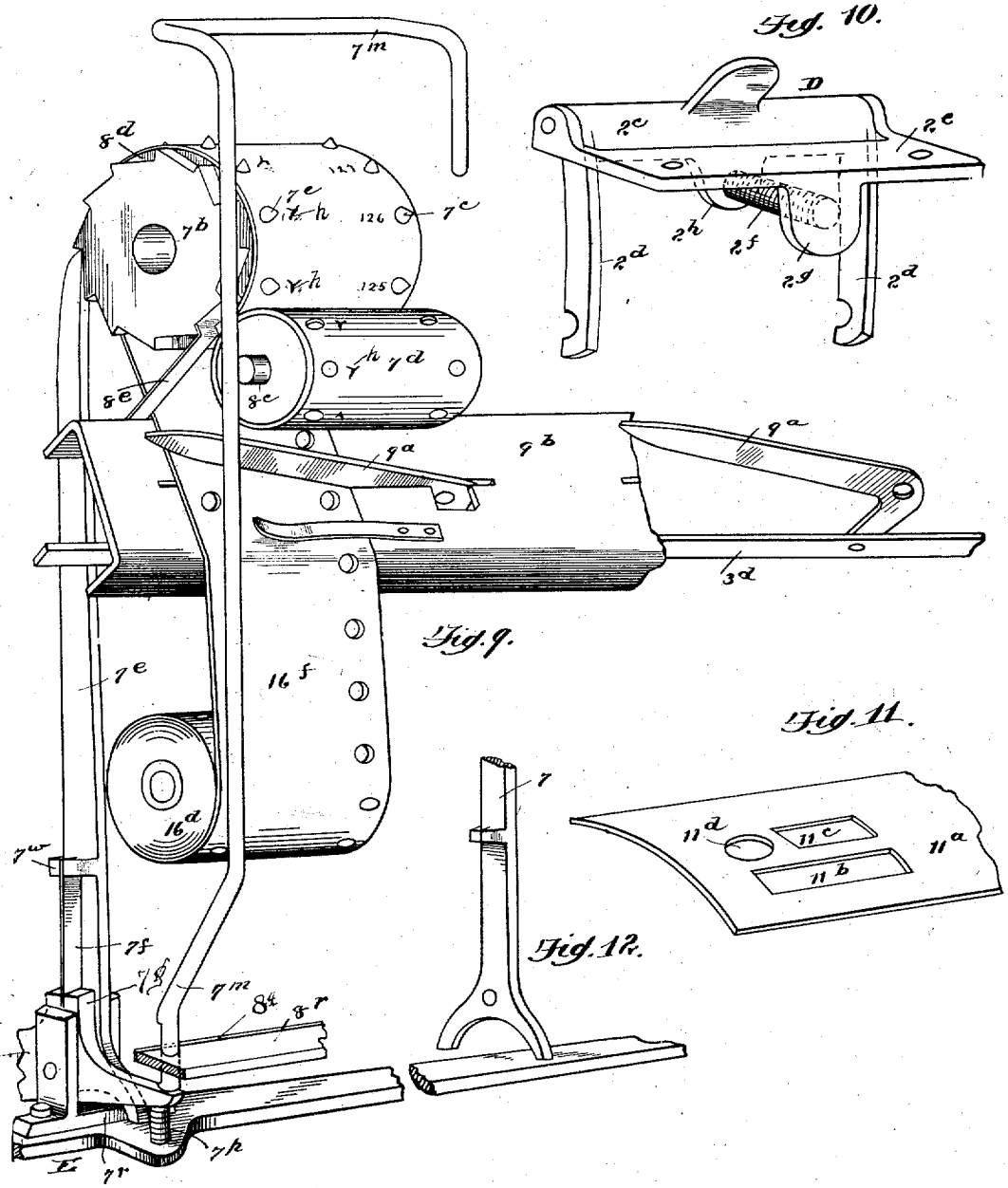

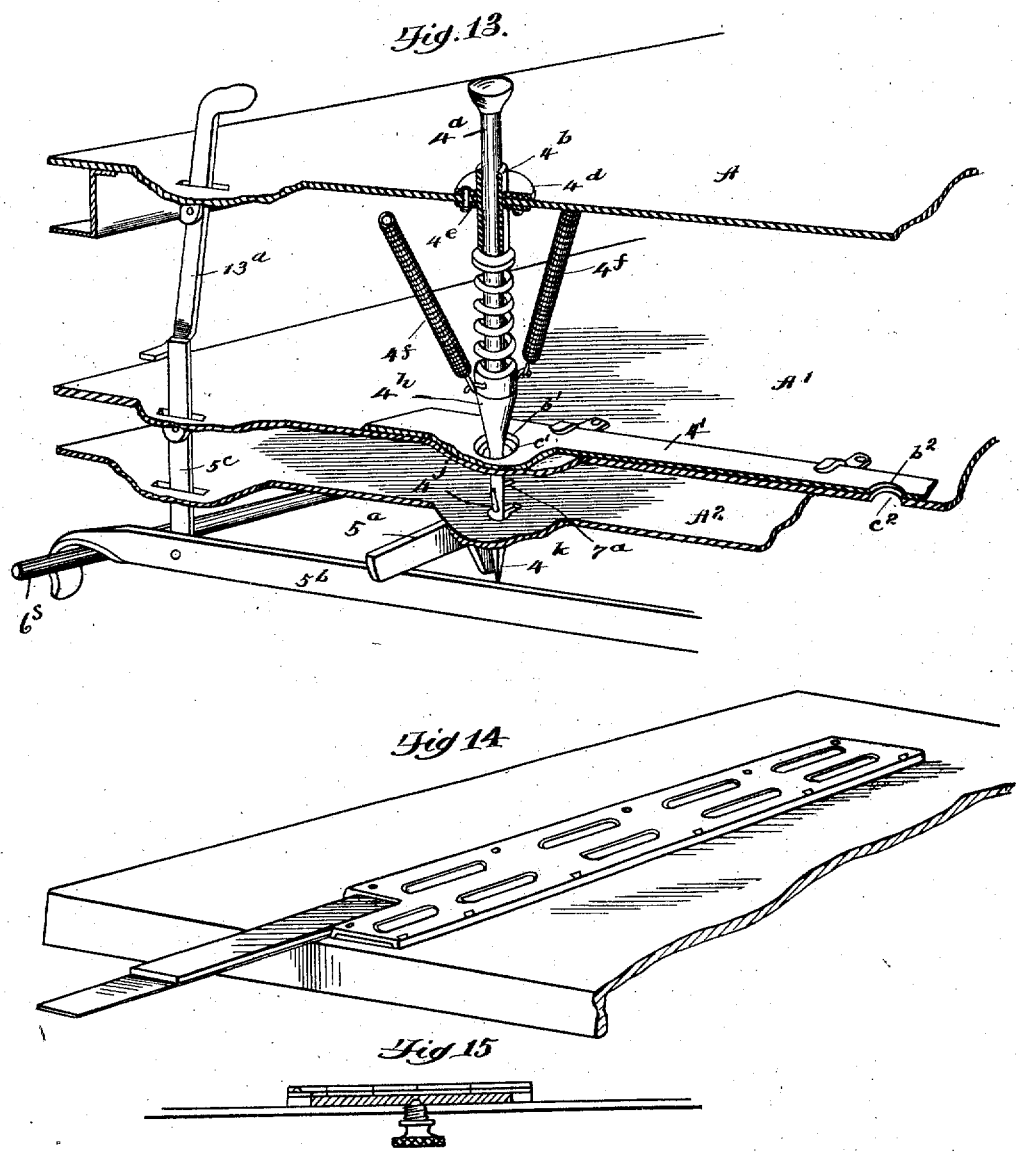

No. 868,579. PATENTED OCT. 15, 1907.
W. B. NORTON.
VOTING MACHINE.
APPLICATION FILED FEB. 27, 1897.
12 SHEETS—SHEET 8.
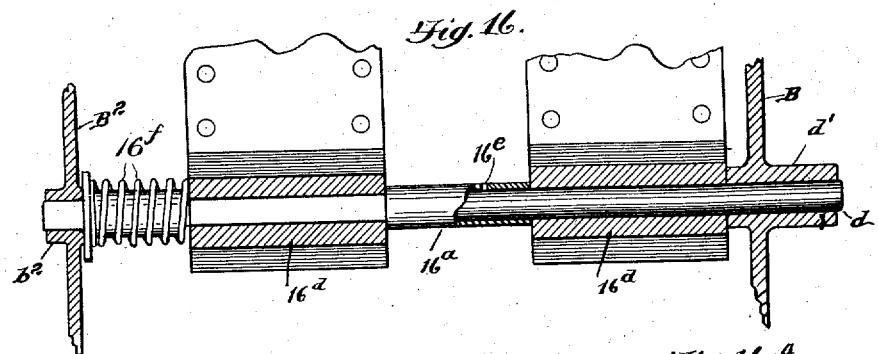
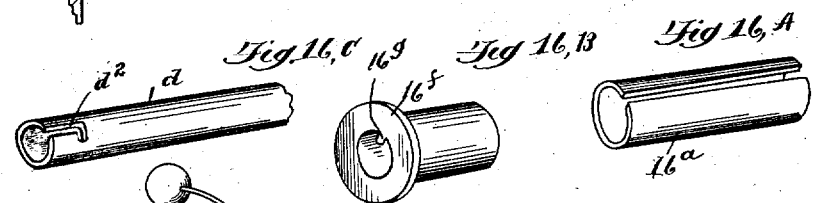
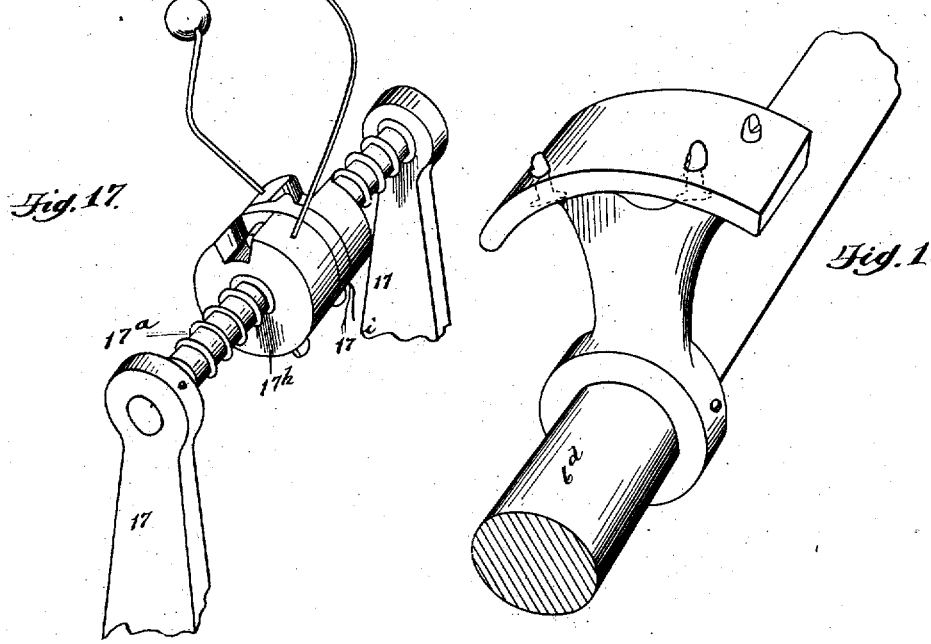
WITNESSES
INVENTOR
William B. Norton
By Parker & Burton
Attorneys.

No. 868,579. PATENTED OCT. 15, 1907.
W. B. NORTON.
VOTING MACHINE.
APPLICATION FILED FEB. 27, 1897.
12 SHEETS—SHEET 9.
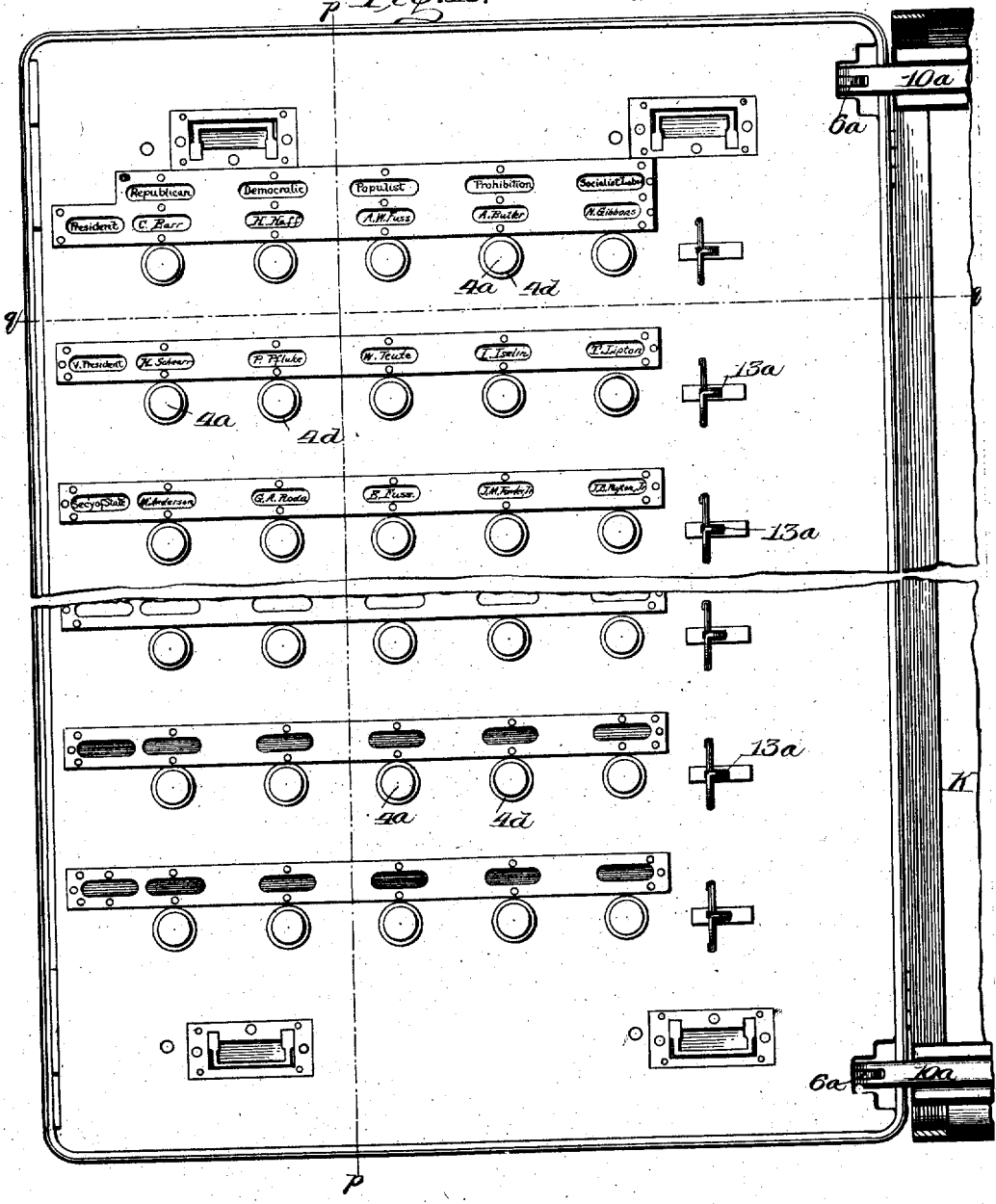
Witnesses:
Walter B. Payne
G. Willard Rich
Inventor
William B. Norton
by Church & Church
his Attorneys.

No. 868,579. PATENTED OCT. 15, 1907.
W. B. NORTON.
VOTING MACHINE.
APPLICATION FILED FEB. 27, 1897.
12 SHEETS—SHEET 10.
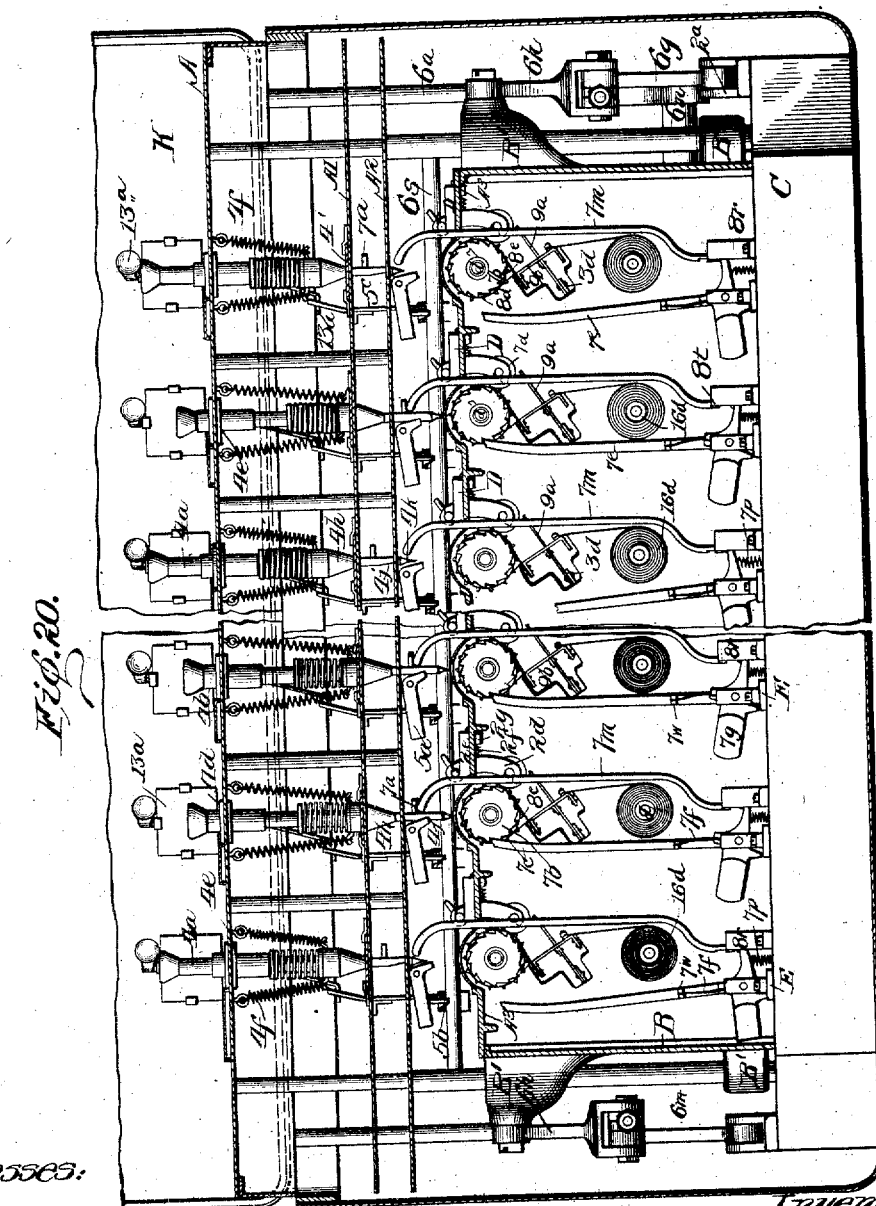
Witnesses:
Walter B. Payne.
G. Willard Rich.
Inventor,
William B Norton
by Church & Church
his Attorneys.

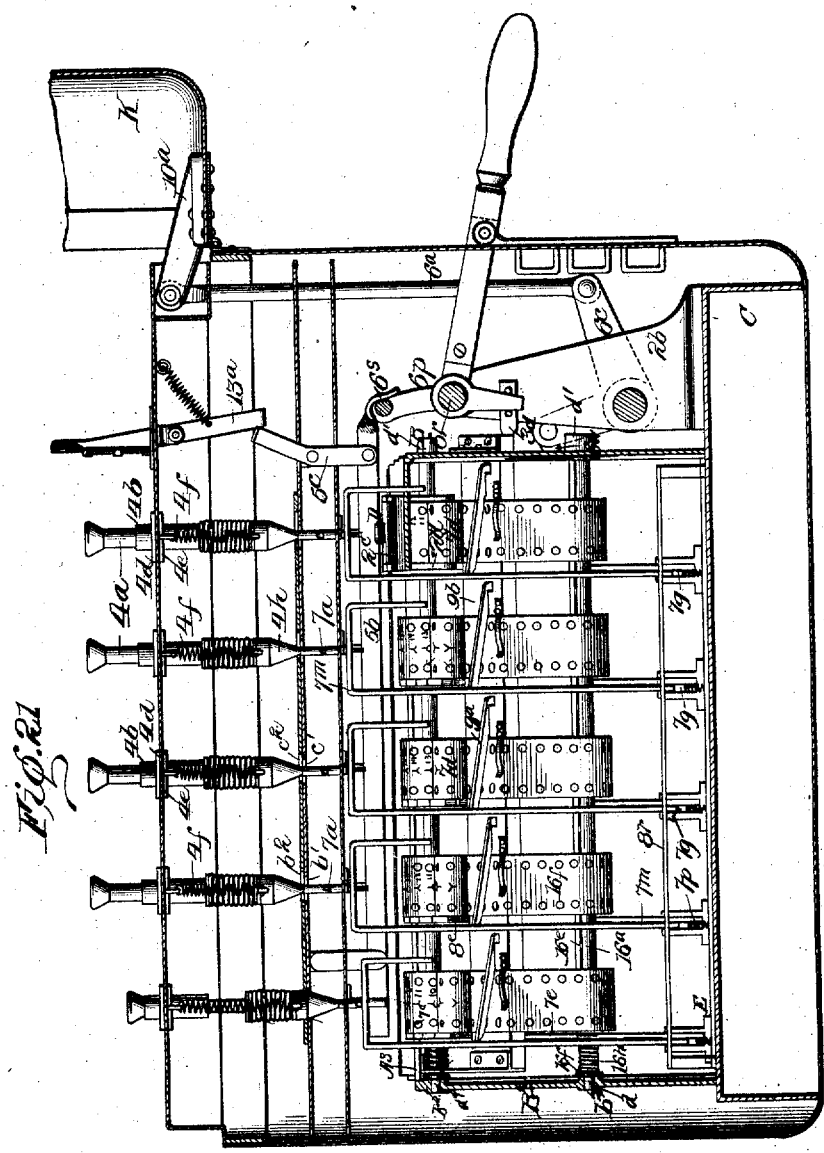

No. 868,579. PATENTED OCT. 15, 1907.
W. B. NORTON.
VOTING MACHINE.
APPLICATION FILED FEB. 27, 1897. 12 SHEETS—SHEET 12.
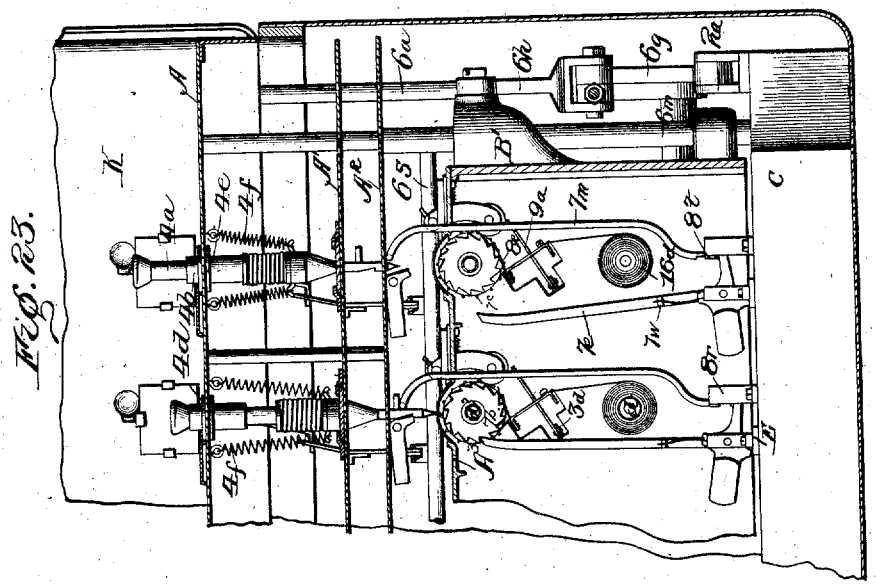
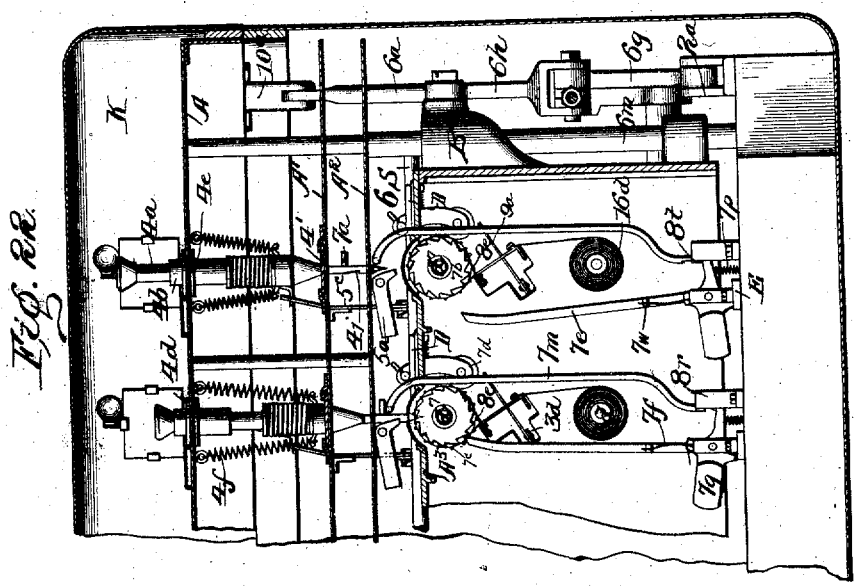

UNITED STATES PATENT OFFICE.

WILLIAM B. NORTON, OF DETROIT, MICHIGAN, ASSIGNOR, BY MESNE ASSIGNMENTS, TO U. S. STANDARD VOTING MACHINE CO., OF ROCHESTER, NEW YORK, A CORPORATION OF NEW YORK.

VOTING-MACHINE.

No. 868,579.      Specification of Letters Patent.      Patented Oct. 15, 1907.

Application filed February 27, 1897. Serial No. 625,335.

*To all whom it may concern:*

Be it known that I, WILLIAM B. NORTON, a citizen of the United States, residing at Detroit, county of Wayne, State of Michigan, have invented a certain new and useful Improvement in Voting-Machines; and I declare the following to be a full, clear, and exact description of the same, such as will enable others skilled in the art to which it pertains to make and use the same, reference being had to the accompanying drawings, which form a part of this specification.

This invention relates to voting machines and has for its object improvements in that class of voting machines in which the voter, instead of casting a ballot, registers his vote mechanically.

In the machine which embodies the invention there are a number of keys, arranged in ranks and files, there being one rank of keys for each office on the ticket, and one file for each party. Of course as the machine is made for repeated use, there may be many keys that would not be brought into use at a particular election, inasmuch as a machine that would be large enough to suffice for say 250 candidates, 50 candidates in each of five different parties, could be employed at an election where there are only two parties and eight or ten or less candidates in each party: the extra keys in such case being so arranged that the voters would not use them and would use only those which were pointed out by some designating characteristic as the ones to be used.

In the drawings: Figure 1, is an external view of the case as seen from the side on which the inspector stands. Fig. 2, is a front view of the case, the open door shows the means of gaining access to the interior for the purpose of placing the ribbons of tally paper in the case. Fig. 3, shows detached, the ribbon cutting lever and its locking hasps. Fig. 4, is an end view of the interior mechanism, showing one rank of keys. Fig. 5, is a side elevation of a part of the machine—it shows only a single key. Fig. 6, shows the lifting and tripping mechanism by which, after the keys have been set, the ballot strips are raised and punctured: the paper rolls and adjuncts thereto are not shown in this drawing. Fig. 7, is an elevation of the paper spools and cutting mechanism. Fig. 8, is a detail of a receiving spool and spindle. Fig. 9, shows in perspective the cutting mechanism. Fig. 10, is a perspective detail of the carrier of the receiving spool $7^d$. Fig. 11, is a detail of the sliding cover over the index drum. Fig. 12, is a detail of the foot of the index tipple (a peculiar pawl used in connection with the ratchet wheel on the index drum.) Fig. 13, shows the upper end of the key plunger and the lever by which a key can be released, if improperly set. Fig. 14, shows the name holder, or ticket holder on the top of the machine. Fig. 15, shows an end elevation of the ticket holder. Fig. 16, shows the shaft of the supply roll. Figs. $16^A$, $16^B$, $16^C$, show details of the parts connected with the shaft of Fig. 16. Fig. 17, shows the bell hammers. Fig. 18, shows the bell ringing cam. Fig. 19 is a plan view of the front plate or ballot support, showing the arrangement of the ballot keys or indicators. Fig. 20, a sectional view on the line $p$—$p$ of Fig. 19. Fig. 21, a sectional view on the line $q$—$q$ of Fig. 19. Figs. 22 and 23, sectional views showing the operation of the registering mechanism.

This machine is intended to be used in such a way that the voter is entirely screened from view, so long as the cover K, of the case is open and the voter has access to the keys or indicators: as soon as he has arranged the keys properly to produce such a registration as he desires, the voter closes the lid down in front, or if he leaves the booth without closing down the lid, an inspector closes it down from the rear, and without getting into a position where he can see the keys, or learn which ones of them have been set. The lid itself acts as a lever and the closing of it actuates the registering mechanism, by lifting the entire frame-work that supports the registering mechanism, lifting the ribbons against the points of such keys as have been set, and puncturing the ribbons. When the lid is next opened, the frame and spools are lowered and the keys released, and those of the registering ribbons that have been just punctured are advanced one step: those of the registering ribbons that have not been punctured by the last action of the lid are not advanced but remain in position: thus in each strip of register ribbon the punctures are consecutive, and the ribbon indicates at a glance, how many votes have been cast for the candidate whose votes are registered on that particular ribbon. The ribbon is prepared by cutting long strips of paper of the proper width and perforating along each margin a line of guide holes (shown in Fig. 9) and opposite these holes are (preferably) placed consecutive numbers printed on the paper by some sort of a numbering machine, as shown in Fig. 9 the numbering does not in any way affect the working of the machine but it enables the inspectors to tell at a glance the number of times the key has been actuated and the ribbon punctured.

Inside the case and resting on the bottom thereof is a base block C, from which rise four posts $6^m$, four hinge knuckles $2^a$, three pillars $2^b$, which support the rock shafts $6^d$, and $6^r$, and two pillars 17, which support the bell shaft. Above the base block C, is a rectangular frame B, that engages the posts $6^m$, by a sliding connection; the posts $6^m$, passing through the holes in the lugs $B^1$, $B^1$; to each of the upper lugs $B^1$, $B^1$, on each end of the frame, is pinned a toggle link $6^h$, and to each of the knuckles $2^a$, is pinned a toggle link $6^s$, thus providing two pairs of toggle links at each end. The two pairs on the one end are connected to the bell crank $6^c$, on the rock shaft $6^d$, by a link $6^w$; the opposite branch of the bell crank $6^e$, has pivoted to it a link $6^u$, which connects with the arm $10^a$ Figs. 4 and 21. This arm $10^a$, turns around the pintle of the hinge-cover, and through this system of links and levers, the cover when it is opened and closed, actuates the frame B. The frame B, carries a number of paper reeling devices, one for each key, and there are as many keys as there are candidates that can be voted for with this machine. These will be described hereafter, at the present time it is only necessary to understand that the keys are arranged in rows both lengthwise of, and across the top plate A, of the machine. The rows across the machine will be called ranks or series. The keys in each rank are independent of the keys in any other rank, but the several keys of each rank are so arranged that any one of them can be set, but only a single one of them can be set at a time to a position to register a vote. The position of the reciprocating frame B, (as shown in Figs. 4 and 6) is that which the frame has when the cover is open; when the cover is closed the link $6^u$ pushes downward, rotates the shaft $6^d$, and straightens the toggle links $6^g$, $6^h$, and lifts the frame B.

The posts $6^m$, which hold and guide the frame B, supports three plates A, $A^1$, $A^2$, the upper plate A, is provided with a stiffening flange, which serves both to stiffen it and to prevent any unauthorized tampering with the machinery below it. Its top surface is perforated for the passage of the key stems, and it is also provided with suitable receptacles and guards for the cards or slips of paper on which the names of the candidates are printed: the second plate $A^1$, supports the slide $4^i$, which prevents more than a single key in a rank of keys from being set. The lower plate $A^2$, is a guide plate for the lower ends of the keys. Where the key stem $4^a$ pierces the upper plate A, it passes through a bushing $4^b$, that is provided on the upper side of the plate with a collar $4^d$, and around the bushing, under the plate A, is a washer $4^e$; the washer $4^e$, and the collar $4^d$, are held together by screws inserted through them and the plate A. Below the washer, and surrounding the key stem, is first, a soft washer, preferably of leather; and next, a spiral spring employed as a buffer spring, and from the plate A to the stem extend two lifting springs $4^f$, whose tension serves to raise the key stem. The key stem at its lower end terminates with a sharp point $4^k$, adapted to puncture, and employed to puncture the paper of the ribbons: above the point is a notch $4^j$, in which engages a catch or dog $5^a$, when the key is pushed downward far enough to produce a registration: above the notch on the opposite side of the key stem is a pin $7^a$, that engages a tipple rod or wire $7^m$, (see Fig. 5 or Fig. 7.) Above the pin $7^a$, and at that part of the stem which reciprocates in the hole through the plate $A^1$, is a long collar $4^h$, conical at its lower end, and above the plate $A^1$, is a sliding plate or strip $4^l$. The strip $4^l$ is adapted to have a slight movement across the machine, and is pierced with holes that are slightly larger than the holes in the plate $A^1$, so that the cone on the collar $4^h$ completely fills the hole in the strip and the hole through the plate $A^1$, but the several holes in the strip are not the same distance from center to center as are the corresponding holes in the plate $A^1$. Thus if the holes $b^1$, $c^1$, are properly disposed to allow the key stem $4^a$, to pass down through them its full throw, the holes $b^2$, $c^2$, will be so disposed that the opening is narrowed, and the cone on the key proper to either of these holes could not be forced down far enough to enable the dog to engage with the notch and hold it down, without shifting the sliding plate $4^l$, and if one key has been forced down and been caught by the dog, no other one of that rank of keys can be forced down until the first key has been released. The dog $5^a$ is supported upon a pin that engages with knuckle lugs on the under side of the plate $A^1$, there is of course one dog for each key, and each has a branch that extends over a bar $5^h$, (there is one such bar with each rank of keys) this bar swings from hangers $5^e$, one of which is extended above the plate A, where it is operated upon by a lever $13^a$, which can be reached by the voter to enable him to release the key if he has accidentally set the wrong key or if for any reason he desires to change a vote that he has set, but has not registered. The bar $5^h$, is also lifted by other means which will be described hereafter. The lifting of the bar and the disengaging of the key stem which is brought about by the lever $13^a$, is only for the use of individual keys, to release them, for the purpose hereinbefore stated: the other releasing mechanism to be hereinafter explained is for the release of all the set keys at a single movement. Under each key is the registering device, (see Figs. 7, 8, 9, 10, 16.)

A cover plate $A^3$, made fast to the top of the reciprocating frame B, is pierced with various slots and holes to allow the proper location of the drum $8^d$, the hanger D, the tipple rod $7^m$, which comprise those pieces of the registering mechanism that lie highest or extend highest upward.

The registering device consists of a paper storing spool $16^d$, a feeding drum $8^d$, a receiving spool or roll $7^d$, and their several adjuncts: the arbors on which these several spools and rolls are mounted are all supported by the side walls of the frame B. The spools rotate on the arbors, and those spools that are on the same arbor are spaced from each other by suitable spacing sleeves. The central arbor $d$, is held in a bearing $d^1$, in the main frame B, and in a bearing $b^2$, in a detachable bearing plate $B^2$: and this arbor $d$ will maintain its position and hold the several spools and sleeves that are strung along it, even after the detachable plate has been removed: the object of this construction being to facilitate the assembling and disassembling of the parts at times when it is necessary to load and unload the ribbon spools before the machine is to be used, and after it has been used at an election.

The bearing $d^1$, is long and is adapted to hold the arbor in place with considerable precision. The arbor $d$, is hollow, or at least that end of it which enters the bearing $b^2$ is hollow, and at this end it is provided with a bayonet catch slot $d^2$. Upon it are strung in alternation the spools $16^d$, and the spacing sleeves $16^a$, the latter are split tubes and are strung on the arbor with the cleft embracing a pin or feather $16^e$: the last sleeve toward the end of the arbor is provided with a collar $16^f$, and with an inward projecting lug $16^g$, adapted to engage the cleft and notch of the bayonet catch slot $d^2$. A spring $16^h$, engages around the sleeve $16^f$, exerts a pressure between the collar and the spool 16$^d$, and aids in assembling or disassembling the parts by temporarily holding them in place at times when the detachable plate B$^2$ is removed.

The paper storing spool 16$^d$, is the one on which the ribbon is stored before the ballots are registered upon it. A somewhat similar way of mounting is employed with the registering drums 7$^b$, these drums are provided with two sets of teeth 7$^c$, which may be called positive movement teeth or pins, and each drum is also provided with a ratchet wheel 7$^b$. The ratchet wheel is engaged by a driving pawl 7$^e$, and a holding pawl 8$^e$ (a spring pawl) fastened to some fixed part of the frame B, as for example to the shear plate 9$^b$. The driving pawl (sometimes called the tipple) is a pivoted spring pawl, pivoted to an auxiliary frame E, that is arranged to slide sidewise into and out of the main reciprocating frame B, and is held to the base frame C. 7$^d$, indicates a receiving spool,—the several receiving spools belonging to a rank of keys are not strung on a single arbor, but each is on an independent arbor, journaled in a hanger 2$^d$: the hanger 2$^d$, is hinged to a carrier plate 2$^c$, and this plate is secured by screws to the frame A$^3$. The two arms of the hanger are united at their upper ends by a yoke 2$^e$, and on the yoke is a handle lug, and a spring bearing lug against which bears a spring 2$^f$, the spring being interposed between the lug 2$^h$ on the hanger yoke and the lug 2$^g$ on the plate. The lower ends of the hanger arms are provided with half round notches which constitute bearings for the ends of the spindle 8$^c$, and the spool 7$^d$ is held to this spindle but allowed to rotate freely upon it. On the periphery of the spool are two cavities 8$^b$, in each of which is a button 8$^a$, To these buttons the end of the strip of record paper is attached, the outer surface of the head of each button is substantially in the surface of the cylinder that bounds the spool 7$^d$.

The paper (a section of which is seen on Fig. 9) is prepared with holes along both edges, and these holes engage over the teeth 7$^c$ of the drum 7$^b$, and as the drum is revolved the paper is pulled from the storage spool. After one layer of paper has been wound on the spool 7$^d$, the teeth of the drum 8$^d$, again engage the holes in the paper, and drive the receiving spool, as the quantity of paper on the receiving spool increases the bearing shaft of that spool is crowded away from the drum, but the periphery of the paper continues in position to allow the teeth of the drum and the holes of the outer layer of paper on the receiving spool to engage. The drum 8$^d$ is rotated by the following described mechanism: The frame which supports the arbors of the several rolls, supports also the bar 7$^r$, from which rise a pair of knuckle lugs, and between these lugs is pinned a pawl 7$^e$, and a tipple foot 7$^g$. In the left upper end of the foot 7$^g$, is inserted a flat spring 7$^f$, the upper end of which engages between the prongs of a cleft lug 7$^w$, on the stem of the pawl: the object of this construction is to enable the pawl to have a yielding pressure when the tipple foot is positively actuated. The spring acts as a cushion between the foot and the pawl and also serves to hold the upper end of the pawl in engagement with the ratchet wheel during the vertical reciprocating movement of the registering mechanism as will be described. The bottom end of the pawl (shown detached in Fig. 12) is forked or widened and the prongs of the fork are stopped against the plate 7$^r$, especially when the pawl rocks backward and swings its top end out of engagement with the ratchet wheel 7$^b$. The stop on the front side is not so essential. The tipple foot 7$^g$, is weighted on one side and on the other extends forward and engages under the lower end of the tipple rod 7$^m$, and over a spring 7$^p$. The lower end of the tipple rod 7$^m$, is slabbed off and is held from escaping upward or downward beyond its normal and proper range of movement, by an elastic strap that rests against the rod at its slabbed off portion. The rod extends upward and terminates at its upper end with a horizontal loop that is arranged to engage under the pin 7$^s$. The action of this part of the mechanism is as follows: The key is pushed down until the pin 7$^s$, contacts the horizontal part of the tipple rod 7$^m$, the further depression of the key pushes the tipple rod down and tilts the upper end of the pawl 7$^e$ into engagement with the ratchet and holds the pawl there under tension of the spring 7$^f$ as shown in Figs. 20 and 21. Any number of keys of different ranks may be depressed and set preparatory to the next action which is effectuated by closing the lid as has been previously explained. The lid in closing acts as a lever to lift the frame B, and this carries up with it the auxiliary frame A$^3$ and the spools and the shearing frame and shear bar, leaving the plate 7$^r$, and the parts supported by it and also the tipple rod and the guide 8$^r$, which holds and guides the lower end of the tipple rod. The lifting is continued until the point of the key stem punctures the paper, and the pawl 7$^e$ snaps under the tooth upon whose face it has been pressing as shown in Fig. 22. The point of the key stem after puncturing the paper, enters a cavity in the drum 8$^d$ (see Fig. 8). When the lid is next opened the frame B and the paper reeling mechanism drop and the ratchet engaging the point of the pawl, as shown in Fig. 23 when the drums are free or clear of key point, rotates the wheel and drum a distance equal to one tooth, thus, only those ribbons are advanced which belong to the keys that have been set. The punctured end of the key is preferably sharpened to present three cutting edges, so that the punctures in the ribbon will present the appearance of three lines radiating from the center, as shown at $h$, Fig. 9. Over each ribbon is a sliding guard plate 11$^a$, (Fig. 11) provided with a peep opening 11$^b$ over the end of the ribbon to show candidate's name at starting point, and another peep opening 11$^c$, over the number that is opposite the hole 11$^d$, through which the stem of the key passes.

When the lid is closed down the arm 6$^n$, from the shaft 6$^d$, rocks under the latched extremity of the arm 6$^p$ on the return movement, with the opening of the lid the arm 6$^p$, and the rod 6$^s$, are rocked and all of the lifting bars 5$^b$ which engage with a hooked extension over the rod 6$^s$ (Fig. 13) are lifted and the keys are all released after the ribbons have been punctured and the registering of the indicating votes has been accomplished.

At the end of the balloting the ribbons are all severed by a single action and are all severed a definite distance from the last puncture made by the key point. With each rank of keys is a shear plate 9$^b$, under the shear plate is a shear bar 3$^d$, which is pivoted to the rock arm 3$^b$ on the shaft 6$^x$. (see Fig. 6). The hand lever 3$^a$, extends through the outer casing (as shown in Fig. 1,) and is provided with a hasp $3^f$ upon which there are three or more eyes, each one of which registers with a lock on the case. It is intended that this handle lever shall remain locked at all times during the use of the voting machine, and that the strips can only be severed at a time when the holders of the several keys of the several locks are present and participating in the work of unlocking the structure.

When the handle $3^a$, is actuated the shear blades $9^a$, which are pinned to both the bar $3^d$, and to the shear plate $9^b$, are actuated to sever the strips of paper $16^f$, and the spools with the record of the voting can then be removed and the result of the balloting determined immediately. The last puncture will be opposite a printed number indicating the total number of votes cast for the candidate.

As a check to indicate the number of voters who have used the machine, there is on the shaft $6^d$, an arm $1^d$, that actuates an engine counter $1^b$, secured to the outside case on the inside thereof. The engine counter is of common construction and it is not thought necessary to describe its details of construction: provision is made to enable the counter to be read from the outside of the case.

A further check is provided through the instrumentality of an alarm bell that is sounded when the case is opened and again when the case is closed. The means by which the bell is actuated is shown in Figs. 6, 17, 18.

17, 17, indicate posts rising from the base C, and furnishing bearings for a bar $17^a$, on which is a collar $17^l$ and two hammer supporting rings, each of which is provided with a notch on one side and at another part with a projecting lug. On the bar between the collar rings is a collar with a stop lug projecting on either side, one of the lugs projecting into a notch in the ring that lies at one side, and the other lug projecting into a notch in the other ring. Opposite to the rings and on the shaft $6^d$, is a sector shaped arm, and through holes in the felly part of this arm are three pins provided with heads on their inner ends to prevent their escape outward and with scarved off outer ends. The pins are held with their outer ends projecting beyond the face of the felly of the sector shaped arm, but are allowed to yield backward against a spring that normally holds them out. Two of the pins have the scarves arranged so that the pins engage with and actuate the ring $17^b$, when the sector arm rocks forward and downward at the closing of the lid. On the return stroke these two pins engage the lugs with the chamfered sides of the pins, and, yielding, slip under the lugs without actuating the ring. At the same time, the third pin, which has its chamfered face arranged on the opposite side, actuates the other ring and rings the bell once.

The entire key board and the partition plates underneath it, including the plates A, $A^1$, $A^2$, can be lifted off from the main frame at any time that it may be desired to do so, and this especially facilitates the rapidity in arriving at a knowledge of the votes that have been cast, either at an intermediate count or at the end of the balloting, so that the result of the balloting can be announced within a very few minutes after the polls have been closed and long before the official reports have been made up.

The official reports are made up when the sliding frames which carry the record ribbons are withdrawn, the record ribbons themselves removed and filed away for reference if desired.

The keys, it will be noted, serve merely to indicate a vote for a candidate and they are, therefore, properly "indicators", the vote indicated by the operator of a key not being cast or registered until the voter has left the proximity of the ballot support or keys, or the latter have been concealed or otherwise rendered inaccessible to him so that there is no opportunity for the voter to manipulate the key or indicator in any manner and thereby fraudulently operate the registering mechanism. This separation of the indicating operation from the operation of registering the votes is not only advantageous, but is a necessity in voting machines and particularly so when taken in connection with the capability possessed by my invention of permitting the voter to retract a vote once indicated by releasing the retainers before the registering operation is accomplished, and he is, therefore, enabled to manipulate the keys or indicators in any way he desires and to examine the ticket indicated by him as a whole before he leaves the proximity of the ballot support and completes the casting of the votes.

The lid or cover for the ballot-board or support constitutes a barrier for preventing access to the latter, and its form may be altered or varied, as desired, the complete cycle of movement of the machine parts being accomplished by the return of this barrier or operating part to a position where the next voter is permitted to indicate his choice of candidates,—that is to say, the voter is permitted to indicate his choice of candidates when the lid is raised only, and between that time and the time that the lid is raised again and the machine is ready for the next voter, the complete operation of the registering mechanism is accomplished.

The registering mechanism has two functions, one being the registering puncture produced by the approach of the paper and key point, the number being indicated by the numbers of figures at the side of the paper strip, and the movement of the strip is caused by the pawl in engagement with the paper feeding wheel or roller. The manually-operable key or indicator controls the position of the pawl, which serves to directly actuate the paper feed roller during the cycle of movement of the machine, and said key or indicator, it will be noted, controls directly the interlocking mechanism (the apertured plates $4^1$) between the keys or indicators, and the actuating pawl cannot be placed in coöperative relation with the feed wheel until the limiting mechanism has been fully operated, preventing the operation of another indicator in the same series or rank.

What I claim is:

1. In a voting machine the combination of a case having a lid, a key board provided with a plurality of keys, each of which is adapted to be moved from its normal position and set in an abnormal position, a plurality of recording ribbons held in a frame which is adapted to be actuated toward and away from the keys by the lid in opening and closing, substantially as described.

2. In a voting machine the combination of a case having a lid, a key board provided with a plurality of keys each of which is adapted to be moved from its normal position and set in an abnormal position, means for releasing any single key from its abnormal position, a plurality of recording ribbons held in a frame which is adapted to be actuated by the lid in opening and closing, and which upon the closing of the lid are brought into recording contact with the keys, substantially as described.

3. In a voting machine the combination of a plurality of keys, means adapted to set each key independently out of its normal position, a plurality of registering ribbons, one for each key, a frame supporting the keys and a frame supporting the ribbons, means adapted to actuate one of said frames with respect to the other and thereby produce a simultaneous registration from each abnormally set key on the ribbon pertaining to it, substantially as described.

4. In a voting machine the combination of a plurality of keys arranged in rows, one way to indicate a party and in rows another way to indicate individual candidates for an office, any one of said keys being adapted to be moved from its normal position and latched in an abnormal position, means whereby only one key of a row can be latched in said abnormal position at a time, and means for releasing the key without its registering or disturbing other keys, substantially as described.

5. In a voting machine the combination of a plurality of keys arranged in rows both ways, and a frame-work adapted to hold and guide them, means adapted to catch and hold any one of said keys in an abnormal position, releasing links one for each cross row adapted to release any key so caught and held, a vibrating rod free from but adapted to engage all the releasing links, means for actuating the vibrating rod whereby all keys of the machine may be released simultaneously, substantially as described.

6. In a voting machine, the combination of a plurality of keys, a guide plate having holes through which the key stems project, a sliding stop plate also provided with holes through which the key stems always project, conical collars on the key stems whereby any key stem which pushes into the hole is adapted to shift the sliding stop plate, and narrow all the passages for keys except the one through which the actuating stem projects, a catch for each key, and means for releasing the catch, substantially as described.

7. In a voting machine the combination of a plurality of keys arranged in a row, a guide plate having holes through which the key stems project, a stop plate having holes through which the key stems project, the sliding stop plate being spaced from center to center of said holes different from the spaces from center to center of the holes in the guide plate, the stems of the keys being each provided with a conical collar, whereby as a key is pushed longitudinally through the holes, the stop plate is shifted and the holes through which other key stems project are so narrowed that a second key cannot be actuated and set until the first has been released, substantially as described.

8. As a means for actuating the register ribbon of a voting machine, a key employed to indicate a candidate, and adapted to be set in a position other than normal, storage and receiving spools and an intermediate ribbon actuating drum provided with a ratchet, a pawl adapted to actuate the ratchet, a rod adapted to engage the pawl and the key when the latter is in its abnormal position, and means adapted to cause an actuating movement of the rod on the pawl, substantially as described.

9. As a means for the quick and easy removal and replacement of the ribbon spools of a voting machine, the combination with an arbor having a bayonet catch notch at its end and with pins 16$^e$ adapted to engage the spacing sleeves, the split spacing sleeves 16$^a$, and the end sleeve 16$^f$, provided with a collar and with a catch 16$^g$, substantially as described.

10. In a voting machine the combination with a feeding drum mounted in a reciprocating frame, and a key adapted to be set to contact a movable part carried by said reciprocating frame, a pawl adapted to actuate the drum, a lever adapted to actuate through the medium of an interposed spring the said pawl and itself adapted to be actuated by the motion of the reciprocating frame and the set key, substantially as described.

11. In a voting machine in combination with the case means for holding, actuating and making record upon a record ribbon, a cutting means and a lever extending through the case whereby the cutter can be actuated from without the machine, substantially as described.

12. In a voting machine in combination with means for holding, actuating and making record upon a record ribbon, a cutting means, a lever for actuating the same provided with a hasp and a plurality of catches adapted to engage with a plurality of locks, substantially as described.

13. In combination with the casing ribbon carrying and actuating means of a voting machine, a means for severing the ribbons at a definite predetermined distance from the last register mark on the ribbon and a lever extending through the casing for actuating the severing means, substantially as described.

14. In a voting machine the combination of a case having a lid, a vote recording mechanism contained in said case, an alarm bell and means whereby the alarm bell is sounded with two alarms, distinguishable the one from the other, means for producing one alarm at the opening and the other at the closing of the lid, substantially as described.

15. In combination with a frame adapted to support a key board and the keys thereof, a second frame adapted to reciprocate with respect to the first frame, and means for producing such reciprocation, a third frame removable from the second and upon which are mounted the record ribbons the said last mentioned frame being adapted to facilitate the placing and removal of register ribbons, substantially as described.

16. In a voting machine, in combination with an outer casing, a removable key board provided with guard flanges extending inside the casing adapted to prevent improper tampering with the mechanism contained in the case, substantially as described.

17. In a voting machine in combination with a base, a bar provided with a row of tipples or pawls, each of which is adapted to actuate the record ribbon, said bar and the tipple or pawls carried thereon being removable from the base, substantially as described.

18. In a voting machine in combination with a base, a reciprocating frame provided with record ribbons, means adapted to actuate the ribbons, a covering frame guarding the reciprocating frame, and provided with keys adapted to produce a record on said ribbons—said covering frame being arranged so that it may be removed from the reciprocating frame and thereby expose the record without otherwise disconnecting the parts of the machine, substantially as described.

19. In a voting machine, the combination of a plurality of registering devices secured to a supporting frame, a parallel plate supporting independently movable indicating mechanism forming part of the permanent structure, in combination with means for imparting a relative movement between the supporting frame and the parallel plate whereby a registry of votes is produced on the registering device, substantially as described.

20. In a voting machine, a reciprocating frame having registering devices secured thereto in rank and file, a parallel plate provided with independently adjustable keys forming part of the permanent structure, means for holding adjusted keys in position to produce a registration, and means for imparting a relative movement between the frame and the parallel plate whereby the adjusted keys produce an impression on the registering device, substantially as described.

21. In a voting mechanism, the combination of a frame and separately operable recording devices carried thereby, a parallel frame and corresponding separately operable record making devices carried thereby and forming part of the permanent structure, means for producing a relative movement between the frames whereby the record making devices produce a record on the recording device, substantially as described.

22. In a voting machine, in combination with a frame and recording devices carried thereby, a parallel frame with record making devices carried thereby, normally held in the position to produce no record when the two frames are brought together, means for independently setting the record making devices to a record making position, and means for producing a relative movement of the two frames toward and away from each other, whereby a record is produced, substantially as described.

23. In a voting machine, the combination of a series of voting keys, a series of corresponding registering devices, mechanism for actuating each registering device, an operative connection between each voting key and the corresponding mechanism for the registering devices, whereby the action of the key shifts said mechanism without operating the registering device by means thereof, and means for simultaneously actuating each such mechanism which has been so shifted to operate the corresponding registering devices.

24. In a voting machine, the combination with a series of registers, of a series of ballot indicators forming part of the permanent structure, one for each register, movable into and out of cooperative relation with their corresponding registers, interlocking devices for preventing the operation of more than a predetermined number of indicators, and means for causing the simultaneous operation of all the registers whose indicators are in operative position.

25. In a voting machine, the combination with a series of register actuators forming a part of the permanent structure and a corresponding series of registers wholly and positively operated by the actuators after the latter have been moved, of a limiting mechanism controlling the operation of the actuators and operable wholly and positively by the latter, and means for causing the simultaneous operation of the actuators upon their registers.

26. In a voting machine, the combination with a series of registers, a corresponding series of register actuators forming a part of the permanent structure movable into cooperative relation with their registers, and serving to operate the registers; and a limiting mechanism operable only by the movement of the actuators, of a closure for preventing access to the actuators, and connections between the parts permitting the operation of the actuators to set position and of the limiting mechanism when the closure is open only, and permitting the actuation of the registers when access to the said parts is prevented.

27. In a voting machine, the combination of a plurality of registers each having an actuator, said registers being positively operable by said actuators upon the relative movement of the registers and actuator in one direction, and said actuators being independent of the register when the parts are moved in the opposite direction, and means for imparting motion to the parts for positively and automatically operating a plurality of said actuators and registers relatively to operate said registers.

28. In a voting machine, the combination of a plurality of registers each capable only of a complete registering movement, with a limiting mechanism for preventing the operation of some only of said registers, and means for first accomplishing a positive complete movement of said limiting mechanism and afterwards accomplishing a complete movement of said register.

29. In a voting machine, the combination of a plurality of registers, a single limiting mechanism common thereto, means for causing the operation of said limiting mechanism and means for causing the positive and complete operation of at least one of said registers subsequently to the full operation of the limiting mechanism.

30. In a voting machine, the combination of two or more actuators with a limiting mechanism having a part in engagement with each of said actuators and operated by the voter's movement of either of said actuators, registers cooperating with said actuators, and means for simultaneously permitting the return of the actuators with respect to said limiting device and accomplishing complete movements of the said registers.

31. In a voting machine, the combination with a plurality of registers, a plurality of manually operated actuators forming parts of the permanent structure by the movement of which the machine is set for operation, and interlocking devices between the actuators, of positively actuated means independent of the manual operation of the actuators, for advancing the registers one full number after the same are set.

32. In a voting machine, the combination with two or more independent registers secured in fixed relation with each other, two or more register actuators forming part of the permanent structure and two or more keys for separately moving said actuators into cooperative relation with their registers, of means operating upon all the registers and actuators for moving them relatively to cause registration or those registers whose indicators are in voted position.

33. In a voting machine, the combination with a plurality of independent registers, a corresponding plurality of actuators forming part of the permanent structure and a limiting device, of means for preventing the operation of a register until the limiting device has received its full movement, and means for subsequently operating the registers.

34. In a voting-machine, the combination with a plurality of registers, one for each candidate, and a key for each candidate, each key being operable in both directions without operating the register, and a separate means dependent upon the operation of each key for operating its register.

35. In a voting machine, the combination with a plurality of registers, of a corresponding plurality of keys and interlocking devices between the keys, independent register operating means one for each register controlled but not operated by said keys to move the registers, and means for actuating said operating means to move the register and afterwards to positively return the operating means.

36. In a voting machine, the combination with a plurality of registers, of a corresponding plurality of keys and interlocking devices between the keys, independent operating means controlled but not operated by said keys to move the registers, actuators for the registers, means for operating said actuators and registers relatively to move the registers and afterwards to positively return the parts to normal position, said means for operating the actuators and registers relatively being stationary during the time that the key is operative by a voter.

37. In a voting machine, the combination of a register mechanism, an actuator which the voter may set or place for operation on the register, but may not operate to move the register, said actuator and register having two relative movements independent of the voter's movement thereof, one to operate the register and the other to positively return the parts to normal position.

38. In a voting machine, the combination with a register and register-operating means forming a part of the permanent structure adapted to be set by a voter for operation, a cover or barrier for preventing access to the voting devices, and means to accomplish the complete movement of the said register through the action of said barrier in a complete cycle of operation of the machine.

39. A voting-machine, having a register for each candidate and a key for each candidate, said keys being operable in both directions without operating their registers, and independently movable means dependent upon the operation of each key for operating its register and releasing said key but not directly moving it.

40. A voting-machine having a register for each candidate and a key for each candidate, said keys being adapted for reciprocation and an actuator forming part of the permanent structure movable with each key and adapted to be positioned for operation upon the associated register by the movement of said key, and means positively operated through the medium of the actuators that are set, to operate the registers thereof.

41. In a voting machine, the combination with a plurality of registers secured to a supporting frame in fixed relation to each other, of a support, a plurality of independently movable ballot indicators thereon, one for each register, corresponding in relative position with the register, each indicator being movable into a position to cooperate with its register when the frame and support are moved relatively, means for moving the frame and support relatively, and interlocking devices between the indicators for permitting the operation of a predetermined number to the operative position.

42. In a voting machine, the combination with a plurality of registers secured to a supporting frame in fixed relation to each other, of a support, a plurality of ballot indicating devices thereon, one for each register, and each independently movable to a position for coöperation with its register, interlocking devices between the indicators to permit the movement of a predetermined number to operative position, and means for causing the relative movements of the register frame and support to cause the coöperation of the actuated indicators and their registers.

43. In a voting machine, the combination with a plurality of registers secured to a supporting frame in fixed relation to each other, and each having an actuating member, of a support, a plurality of ballot indicators thereon corresponding with the registers and each having a part for coöperation with the actuating member of its register, when moved to operative position, interlocking devices for permitting the operation of a predetermined number of indicators only, and means for causing the relative movement of the frame and support so as to cause the operation of the registers whose indicators are operated.

44. In a voting machine, the combination with a plurality of registers secured to a supporting frame in fixed relation to each other, of a support, a plurality of ballot indicators thereon corresponding with the registers and each adapted to be moved into operative relation with its register, interlocking devices for permitting the operation of a predetermined number of indicators only, means for causing the positive relative movement of the frame and support and resetting devices for the indicators.

45. In a voting machine, the combination with a plurality of registers secured to a supporting frame in fixed relation to each other, of a support, a plurality of ballot indicators thereon corresponding with the registers and each movable into and out of a position to coöperate with its register, interlocking devices between the indicators for permitting the movement of a predetermined number of them to coöperative position, and means for moving the frame and support relatively to cause the actuated indicators to coöperate with their registers.

46. In a voting machine, the combination with a plurality of registers mounted on a frame in fixed relation to each other, of a plurality of independently adjustable ballot indicators corresponding with the registers and adapted to be actuated into operative relation with the registers, a barrier for preventing access to the indicators, operating devices for causing the relative movements of the register frame and the indicators to cause the latter to coöperate with the registers, and connections between said barrier and the operative devices for causing their simultaneous operation.

47. In a voting machine, the combination with a ballot board or support containing a ticket to be voted, a plurality of separate ballot indicators corresponding to the ticket, movable by the voter into and out of coöperative relation with their registers, interlocking devices to prevent the operation of more than a predetermined number of indicators to operative position, a plurality of registering devices corresponding to the indicators, resetting devices for the indicators and operating devices for causing the relative movements of all the registers and indicators to register the ballots indicated, of a barrier or cover for the ballot board, and connections between it and the said operating devices and the resetting devices whereby the indicated ballots will be registered, the indicators reset to normal position, and the barrier removed at a single cycle of operation.

48. In a voting machine, the combination with a plurality of series of registers, of a plurality of series of ballot indicators forming part of the permanent structure, one for each register, and each capable of movement into and out of coöperative relation with its register without operating the same, interlocking devices between the indicators in the same series for preventing the movement of more than a predetermined number into coöperative relation with their registers, and means for causing the operation of the registers whose indicators have been operated and left in coöperative relation therewith.

49. In a voting machine, the combination with a series of movable voting keys or indicators, and means for automatically returning them to normal position, a series of corresponding registers, means for holding the keys when operated, a manually-operable device for releasing the indicators, interlocking devices for preventing the operation of more than a predetermined number of indicators in the series, and means for simultaneously operating the registers whose indicators are left in voted position.

50. In a voting-machine, the combination with a series of spring-retracted voting keys or indicators, registers with which they are adapted to coöperate, retainers for holding the operated indicators, means for releasing the retainers, and means for subsequently causing the operation of the registers whose indicators are retained in voted position.

51. In a voting machine, the combination with a series of spring-retracted voting indicators, registering devices with which they are adapted to coöperate, retainers for the indicators, and means for releasing the indicators and permitting their return before operating upon the registers.

52. In a voting-machine, the combination with a series of spring-retracted voting indicators, interlocking devices between them, registers with which the indicators are adapted to coöperate, separate retainers for the indicators, and means for subsequently causing the operation of the registers whose indicators are retained in voted position, of devices for operating the retainers to release the indicators.

53. In a voting machine, the combination with a spring-retracted voting key or indicator, and a register with which it is adapted to coöperate, of a retainer for holding the indicator when operated, and a device for releasing the key before the operation of the register.

54. In a voting machine, the combination with a series of voting keys or indicators, retainers therefor, and a series of registers corresponding to the indicators, of means for actuating the registers whose indicators are retained, means for releasing the retainers after the operation of the registers, and a movable part operable by the voter to release the retainers before the actuation of the registers.

55. In a voting machine, the combination with a plurality of ballot indicators automatically operable in one direction, registers with which they coöperate to indicate a vote, and retainers for holding the keys when operated, of means for causing the operation of the registers whose indicators are retained, and a movable member for releasing all the retainers before the actuation of the registers when desired.

56. In a voting machine, the combination with a plurality of ballot indicators automatically operable in one direction, a plurality of registers with which they coöperate to indicate a vote, and retainers for holding the keys when operated, of means for causing the operation of the registers whose indicators are retained, a movable member for releasing the retainers operable by the operating means after the registers are actuated, and a device under the control of the voter and operating upon said member for releasing the retainers before the operation of the registers when desired.

57. In a voting machine, the combination with a plurality of ballot indicators, a corresponding plurality of registers, and retainers for holding the indicators in coöperative relation with their registers, of means for actuating the registers whose indicators are retained, a releasing member coöperating with the retainers and operated upon by the register actuating means after the actuation of the registers, and a device operable by a voter to release the retainers prior to the actuation of the registers when desired.

58. In a voting machine, the combination with a plurality of registers, each having an actuator, of a corresponding series of indicators movable into and out of coöperative relation each with an actuator, in combination with means for producing a relative movement between the registers and actuators whose indicators remain in coöperative relation thereto.

59. In a voting machine, the combination with a series of registers, of a corresponding series of keys or indicators, means for retaining the keys when operated, means for releasing the keys from coöperative relation with the registers without having caused the operation of the latter.

60. In a voting machine the combination with a movable ballot indicator, a catch for retaining the indicator of a counter, a counter actuator normally out of operative connection with the counter and adapted to be placed into coöperative relation therewith by the movement of the indicator but incapable of being directly moved to operate the counter manually operable releasing device for the indicator catch and means for operating the counter only one number and also releasing the catch to permit the return of the indicator to original position during a complete cycle of operation of the machine.

61. In a voting machine the combination with a counter of an actuator therefor forming a part of the permanent structure adapted to be operated by a voter into coöperative relation with the counter but incapable of direct actuation by the voter to move the counter, and means controlling access to the actuator operating device and adapted to cause the relative movements of the actuator and counter to operate the counter one number and return the parts to original position during a complete cycle of operation of the machine.

62. In a voting machine the combination with a movable ballot indicator, of a counter, a counter actuator capable of being moved into coöperative relation with the counter by the movement of the indicator but incapable of movement by the indicator to operate the counter, a catch for retaining the indicator and means for operating the counter and actuator relatively to cause the movement of the former one number only and for releasing the catch during the complete cycle of movement of the machine.

63. In a voting machine, the combination with a plurality of ballot indicators of an equal number of counters, counter actuators capable of movement by the indicators into coöperative relation with the counters but incapable of movement by the indicators to advance the counters and means for causing the operation of the counters whose indicators have been moved to voted position and returning the indicators and actuators to original position during a complete cycle of operation of the machine.

64. In a voting machine the combination with a plurality of ballot indicators, and interlocking devices to prevent the operation of more than a predetermined number of an equal number of counters, counter actuators therefor capable of being set in coöperative relation with the counters by the movement of the indicators but incapable of movement by the indicators to actuate the counters and means for effecting the simultaneous operation of the actuators and the return of the indicators to original position.

65. The combination in a voting machine, of counters, actuators therefor forming part of the permanent structure of the machine, said actuators being adapted to be operated to voted position without operating the counter, means for limiting the actuators operated to a predetermined number and positively actuated means operated by the machine for simultaneously advancing all said counters one number whose actuators have been placed in voted position.

66. The combination in a voting machine, of a plurality of counters, an actuator for each forming part of the permanent structure of the machine, said actuators being adapted to be operated to voted position by a voter without operating their counters and positively actuated means operated by the machine for simultaneously advancing all of said counters one number whose actuators have been placed in voted position.

67. A voting machine having a counter for each candidate and a key for each candidate, said keys being adapted for reciprocation or operation by a voter, an actuator moved when each key is operated and adapted to be positioned for operation upon the associated counter by the movement of said key and means for independently operating said actuators and counters relatively simultaneously whether the same have been operated upon by the keys or not.

68. The combination with a counter, of a voting key, a holding device therefor, an actuator movable when said key is operated in one direction and in turn operable upon said counter, positively actuated means for thus operating said actuator, said key alone controlling the relation between said actuator and counter for registering votes, said actuator being concealed and at all times prevented from direct operation by the voter and said counter being concealed from view and a manually operable device for releasing the key holding device.

69. The combination in a voting machine, of a plurality of counters with a key for each, an independent counter operating means for each key controlled but not operated thereby and means for actuating said operating means to move the counter one step and allow the return of the operating means and a suitable limiting mechanism operable by said keys.

70. The combination in a voting machine, of a plurality of counters with a key for each, an independent counter actuating means for each key controlled but not operated thereby and means for operating said actuating means to move the counter one step and independent means operating thereafter to return the keys and allow the actuators to return to their initial positions therewith, and a suitable limiting mechanism controlling the operation of the keys.

71. In a voting machine the combination with a plurality of ballot indicators forming a part of the permanent structure and interlocking mechanism between them, of a separate counter for each indicator, a counter actuator for each indicator also forming a part of the permanent structure, connections between the indicators and their actuators for placing the latter in operative connection with the counters when the indicators are operated, but without operating the counters, and means for positively and simultaneously operating the counter actuators and counters relatively to cause the complete operation of the counters.

72. The combination in the mechanism of a voting machine, of two or more counters each provided with a toothed wheel, interlocking mechanism arranged between the counters, operating mechanism forming part of the permanent structure adapted to operate the toothed wheels and a reciprocating key or indicator for each counter arranged when operated to place the operating mechanism into coöperative relation with the wheel of the selected counter before the operation of said operating mechanism so that the counter is operated wholly by the latter.

73. In a voting machine the combination with a counter, of an actuator therefor forming part of the permanent structure adapted to be operated by a voter into coöperative relation with the counter but incapable of direct actuation by the voter to move the counter and means controlling access to the actuator operating device and adapted to cause relative movements of the actuators and counter to operate the counter one number and return the parts to original position during a complete cycle of operation of the machine.

74. In a voting machine, the combination with registering mechanism for each candidate, a voting key for each candidate, controlling but not operating the registers, movable connections embodying register actuators forming part of the permanent structure arranged between the keys and registers and independently controlled in position with relation to the registering mechanism by the movement of the keys and interlocking mechanism for preventing the operation of some of said keys, of means for simultaneously moving all the registers and actuators in the same direction relative to each other.

75. In a voting machine, a registering mechanism, a movable pawl, a key for controlling the movement of said pawl to a position to actuate the registering mechanism, independent means for actuating said pawl and registering mechanism relatively when in such position and means actuated by said key for preventing the actuation of the other registering mechanisms.

76. In a voting machine, a suitable registering mechanism, a pawl for actuating the same, a voting key independent of the pawl for controlling its movement to actuate the register, and means forming part of the permanent structure actuated by the key for preventing the actuation of other registering mechanisms.

77. In a voting machine, the combination with a movable ballot indicator forming part of the permanent structure, of a counter, a counter actuator also forming part of the permanent structure, connections between the indicator and actuator for placing the latter in operative connection with the counter when the indicator is operated but without operating the counter, and means controlling access to the indicator for positively operating the counter and its actuator relatively to cause the complete operation of the counter.

78. In a voting machine, the combination with a series of movable ballot indicators forming part of the permanent structure and interlocking devices between said indicators to prevent the operation of more than a predetermined number, of a series of counters one for each indicator, a series of counter actuators also forming a part of the permanent structure, connections between the indicators and actuators for placing the latter in operative connection with their counters when the indicators are operated but without operating them to actuate the counters and means for positively moving the counters and all of the operated actuators relatively and simultaneously, to cause the movement of the counters controlled thereby.

79. In a voting machine, the combination with a movable ballot indicator forming part of the permanent structure and a retainer therefor, of a counter, a counter actuator normally out of connection with the counter, connections between the indicator and actuator for placing the latter in operative connection with the counter when the indicator is operated, and devices for moving the counter and actuator relatively to operate the counter and release the indicator.

80. In a voting machine, the combination with a movable ballot key forming part of the permanent structure, of a counter, a counter actuator normally out of operative connection with the counter, a key retainer, connections between the key and actuator for connecting the latter with the counter, devices for moving the actuator and counter relatively and releasing the key and a barrier controlling access to the key and operating the releasing device.

81. In a voting machine, the combination with a chamber and a barrier, a plurality of series of ballot indicators forming a part of the permanent structure and interlocking devices between the indicators of each series to prevent the operation of more than a predetermined number, of a series of counters, one for each indicator, a series of counter actuators forming a part of the permanent structure normally out of operative contact with their counters, operating devices controlled by the ballot indicators for operatively connecting the actuators with their counters, and connections between the barrier and the counters and actuators for moving all of the counters and actuators relatively and simultaneously in a direction to actuate the counters whose indicators are in voted position.

82. In a voting machine, the combination with a booth or chamber, a plurality of series of ballot indicators forming a part of the permanent structure and interlocking devices between the indicators of each series to prevent the operation of more than a predetermined number, of a series of counters one for each indicator, a series of counter actuators forming a part of the permanent structure normally out of contact with their counters, operating devices controlled by the ballot indicators for operatively connecting the actuators with their counters, and connections between all of the counters and actuators for causing the simultaneous and relative operation of the counters and actuators in a direction to actuate the counters whose indicators are in voted position.

83. A vote registering mechanism comprising independent registering mechanism furnished with operating devices respectively, a detachable member having separately adjustable devices thereon to coöperate with the registering mechanism operating devices, means for causing the relative movements of the detachable member and the registering mechanisms and means for displacing the separately adjustable devices from operative position.

84. In a voting machine, the combination of a series of registers, a detachable ballot board, a series of ballot indicators forming a part of the ballot board one for each register movable into and out of voted position, interlocking devices for preventing the operation to voted position of more than a predetermined number of indicators and means for causing the simultaneous operation of all the registers whose indicators are in voted position.

85. In a voting machine, the combination with a casing and a series of registers therein, of a removable ballot board having ballot indicators thereon and means for causing the relative movement of the registers and ballot board to cause the actuation of the registers whose indicators have been operated.

86. The combination with a casing and registers therein, of a removable ballot board, ballot indicators thereon and interlocking devices between said indicators, and means in the casing for causing the relative movements of the ballot board and registers to cause the actuation of the registers whose indicators are in voted position.

87. The combination with a casing and registers therein, of a removable ballot board, ballot indicators thereon, interlocking devices between said indicators, means within the casing for causing the relative movement of the ballot board and registers to cause the actuation of the registers whose indicators are in voted position and means for resetting the ballot indicators to normal position after the operation of the registers.

88. In voting apparatus, a ballot board comprising a support and movable members thereon, separate and independent registers and a case containing said registers and constructed to admit parts on the ballot board to the registers to control the operation of the same.

89. In a vote registering machine, the combination of a registering mechanism, a ballot member furnished with a movable part for controlling the operation of the registering mechanism, means for producing a relative movement between the ballot member and the registering mechanism to cause said mechanism to be operated by the part and operative means for resetting the said part.

90. A detachable ballot board comprising a body portion, a plurality of register actuating parts movable upon said body portion into and out of operative position and means carried by said body portion adapted to limit the number of register actuating parts that can be moved to operative position.

91. In a voting machine, the combination with a series of registers, of a series of ballot indicators forming part of the permanent structure, one for each register freely movable into and out of coöperative relation with their corresponding registers, interlocking devices for preventing the operation of more than a predetermined number of indicators, and means for causing the simultaneous operation of all the registers whose indicators are in operative position.

92. A voting machine comprising a casing, voting devices therein embodying a plurality of registers and a corresponding plurality of indicating devices all forming part of the permanent structure, resetting mechanism embodying an oscillatory part and connections for wholly operating the registers when said part is moved in one direction and resetting the machine when moved in the opposite direction.

93. A voting machine comprising a plurality of registers, a corresponding plurality of indicating devices all forming part of the permanent structure, an oscillatory part or member and connections between it and the registering and indicating mechanisms causing the complete operation of the registers when said member is moved in one direction and the restoration of all the mechanism to normal position when it is moved in the opposite direction.

94. In a voting machine, the combination with a plurality of registers and actuators therefor, of a corresponding plurality of indicators movable into and out of coöperative relation with their actuators without actuating the registers, interlocking devices embodying wedges or enlargements connected to the indicators and operable by the latter in a direction substantially parallel with that of the movement of the register actuators and means for causing the simultaneous operation of the registers whose indicators are left in voted position.

95. A voting machine comprising, a plurality of registers, a corresponding plurality of actuators therefor forming part of the permanent structure and capable of being rendered operative at the will of the voter an operating member movable in two directions and connections between said member and the registers and actuators for causing the relative movements of the designated registers and actuators to wholly operate the latter when it is operated in one direction and restore the parts to normal position when operated in the opposite direction.

96. A voting machine comprising a plurality of registers, a corresponding plurality of actuators therefor, forming part of the permanent structure, indicators for rendering operative a predetermined number of said actuators, an oscillatory rock shaft and connections between said shaft, the registers, actuators and indicators for causing the complete actuation of the registers whose indicators have been left in operated position when the shaft is oscillated in one direction, and causing the restoration of the parts to normal position when said shaft is operated in the opposite direction.

97. In a voting machine, the combination with a board or support, a plurality of ballot indicators mounted thereon, interlocking devices for preventing more than a predetermined number of indicators occupying voted position at one time, of a plurality of registers corresponding to the indicators and a frame arranged parallel with said indicator support and upon the movement of which the actuation of the registers is dependent.

98. In a voting machine, the combination with a board or support, a plurality of ballot indicators mounted thereon, interlocking devices for preventing more than a predetermined number of indicators occupying voted position at one time, of a plurality of register actuators corresponding to the indicators and a frame extending parallel to the support and movable toward and from it, the actuation of the registers whose indicators are left in voted position being dependent upon the movement of said frame.

99. In a voting machine, the combination with a plurality of movable ballot indicators movable into and out of voted position, and interlocking devices to prevent more than a predetermined number from simultaneously occupying voted position, a corresponding plurality of registers and means, as a barrier, for operating the registers whose indicators are left in voted position and restoring the parts to normal position.

100. In a voting machine, the combination with a plurality of ballot indicators, and interlocking devices to prevent the operation of more than a predetermined number, of an equal number of counters, counter actuators therefor capable of automatic movement into coöperative relation with the counters upon the movement of the indicators but incapable of movement by the indicators to actuate the counters, and means for effecting the simultaneous operation of the actuators and the return of the indicators to original position.

In testimony whereof, I sign this specification in the presence of two witnesses.

WILLIAM B. NORTON.

Witnesses:
CELIA GRANT,
MARION A. REEVE.